(12) United States Patent
Chandhoke

(10) Patent No.: US 11,288,281 B2
(45) Date of Patent: Mar. 29, 2022

(54) DATA MODEL FOR MEASUREMENT DATA STORAGE IN DATABASES

(71) Applicant: NATIONAL INSTRUMENTS CORPORATION, Austin, TX (US)

(72) Inventor: Sundeep Chandhoke, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1 day.

(21) Appl. No.: 16/875,566

(22) Filed: May 15, 2020

(65) Prior Publication Data

US 2021/0357420 A1   Nov. 18, 2021

(51) Int. Cl.
*G06F 16/25* (2019.01)
*G06F 16/22* (2019.01)

(52) U.S. Cl.
CPC .......... *G06F 16/254* (2019.01); *G06F 16/221* (2019.01); *G06F 16/2282* (2019.01); *G06F 16/258* (2019.01)

(58) Field of Classification Search
CPC .. G06F 16/254; G06F 16/2282; G06F 16/258; G06F 16/221
See application file for complete search history.

(56) References Cited

U.S. PATENT DOCUMENTS

| | | | |
|---|---|---|---|
| 2005/0240614 A1* | 10/2005 | Barsness | G06F 16/2462 |
| 2016/0034158 A1* | 2/2016 | Livesay | G05B 19/41835 715/736 |
| 2016/0034329 A1* | 2/2016 | Larson | G05B 23/0283 702/188 |
| 2017/0262508 A1* | 9/2017 | Garcia | H04L 43/10 |
| 2019/0188308 A1* | 6/2019 | Simon | G06F 16/219 |
| 2020/0150621 A1* | 5/2020 | Dean | G06F 16/9535 |
| 2020/0175451 A1* | 6/2020 | Powers | G06F 3/048 |
| 2020/0285625 A1* | 9/2020 | Baba | G06F 16/258 |
| 2020/0379454 A1* | 12/2020 | Trinh | G06N 3/0454 |
| 2021/0142340 A1* | 5/2021 | Oda | G06F 16/957 |

* cited by examiner

*Primary Examiner* — Dangelino N Gortayo
(74) *Attorney, Agent, or Firm* — Kowert, Hood, Munyon, Rankin & Goetzel PC; Jeffrey C. Hood; Luke Langsjoen

(57) ABSTRACT

A non-transitory computer-readable memory medium may store a first table comprising rows, wherein each row comprises a first data set identification (ID) field which stores a measurement data set identifier value identifying a measurement data set, and one or more fields for storing measurement data metadata associated with the identified data set. The medium may also store a second table comprising rows, wherein each row comprises a second data set identification (ID) field which stores a measurement data set identifier value present in the first data set ID field. The second table may also store a datapoints field for storing individual data set datapoints and a data set index field corresponding to an ordering of the individual data set datapoints. At least a portion of each of the fields of both the first and second tables may be stored in a columnar format in contiguous memory.

20 Claims, 6 Drawing Sheets

| Property Time | Property 1 | Property 2 | Property 3 | Property 4 | Property n | Data Set ID |
|---|---|---|---|---|---|---|
| Mon Jul 29 06:10:15 2019 | 0 | 255456 | 1 | Voltage | 0.344 | 2652328706068634821248901186 |
| Mon Jul 29 06:11:10 2019 | 1 | 2 | 1 | Voltage | 0.3455 | 2652328706068634821248901132 |
| Mon Jul 29 06:12:01 2019 | 2 | 946 | 3 | Voltage | 0.2994 | 2652328706068634821248902346 |
| ... | ... | ... | ... | ... | ... | ... |

*FIG. 4A*

| Property Time | Data Set ID | Measurement Datapoints | Data Set Index |
|---|---|---|---|
| Mon Jul 29 06:10:15 2019 | 2652328706068634821248901186 | 0.00234 | 0 |
| Mon Jul 29 06:10:15 2019 | 2652328706068634821248901186 | 0.0034 | 2 |
| Mon Jul 29 06:10:15 2019 | 2652328706068634821248901186 | 0.00234 | 3 |
| ... | ... | ... | ... |

*FIG. 4B*

DATA MODEL FOR MEASUREMENT DATA STORAGE IN DATABASES

FIELD OF THE INVENTION

The present invention relates to the field of measurement and data storage, and more particularly to an improved method of measurement data storage and retrieval.

DESCRIPTION OF THE RELATED ART

In many test, measurement, or industrial applications, measurement devices or instruments collect data or information from an environment or unit under test (UUT), and may also analyze and process acquired data. Examples of instruments include oscilloscopes, digital multimeters, pressure sensors, temperature sensors, vibrations sensors, cameras, etc. The information that may be collected by respective instruments includes information describing voltage, resistance, distance, velocity, pressure, oscillation frequency, humidity, temperature, images and/or video, among others.

Measurement data that is generated when performing various types of tests, including simulations or validation tests, may comprise a variety of types, such as images, video, audio, temperature, pressure, etc. As one example, the measurement data may be of a waveform type, e.g., may depict one or more signals that are aperiodic, quasi-periodic or periodic in nature. Such measurement data signals can be time or frequency-based and comprise hundreds, thousands, or in many cases, millions of data points. There are many different file-formats in which these measurements are saved, such as CSV, HDF5, MDF, TDMS and CAN-bus logs.

Measurement data is typically stored as raw data or files on non-volatile memory (e.g., disk) and information that enables finding these files (metadata) are stored in a row-oriented database structure. To compare this measurement data across multiple files, multiple files in their entirety must be loaded into computer memory and compared. This process becomes cumbersome and, in most cases, impossible when signals have millions of points each. This process is further constricted because central processing unit (CPU) memory and compute units limit the number of files that can be loaded for analysis and comparison at any given time. Therefore, improvements in the field are desirable.

SUMMARY OF THE INVENTION

Embodiments are presented herein of a system and method for storing and retrieving measurement data and for performing queries on this data. Embodiments presented herein also provide for a non-transitory computer-readable memory medium comprising program instructions that may execute the operations described herein. Embodiments described herein may address the above problems by defining a data model that enables use of horizontally scalable column-oriented databases to efficiently store and analyze very large sets of measurement data, thus enabling queries to efficiently access and analyze the data.

A non-transitory computer-readable memory medium may comprise program instructions that are executable to receive first measurement data comprising a plurality of measurement data sets and associated metadata, and to create and store the data using tables described herein. The program instructions may create and store a first table (Metadata Table) comprising a plurality of rows and columns, wherein each row of the first table comprises one or more fields for storing metadata associated with the measurement data set as well as a first data set identification (ID) field which stores a data set identifier value identifying a set of measurement data to which the metadata is associated.

The medium may also store a second table (Measurement Data Table) comprising a plurality of rows and columns, wherein each row of the second table comprises a data set datapoints field for storing individual measurement data set datapoints associated with the set of measurement data. The second table may also store a data set index field corresponding to an ordering of the individual data set datapoints. Each row of the second table may further comprise a second data set identification (ID) field which stores a data set identifier value, wherein this data set ID value corresponds to (e.g., is the same as) one present in the first data set ID field of the first table. The data set ID values in each of the first and second tables thus create a "tie" or "link" between measurement data in the second table and its corresponding metadata stored in the first table. At least a portion of each of the fields of the first table and the second table may be stored in a columnar format in contiguous memory, e.g., in a data warehouse configured to store data in a columnar format. This enables faster and more efficient storage of the metadata and sets of measurement data.

Stated another way, the first table may be described as comprising a plurality of columns, the plurality of columns comprising one or more (preferably a plurality of) metadata columns. Each metadata column has entries storing measurement data set metadata, wherein each entry of metadata is associated with a respective set of measurement data. The first table also includes a data set identifier column which stores respective data set identifiers, wherein each entry in the column is a data set identification (ID) field which stores a data set identifier value identifying the set of measurement data to which the metadata in the corresponding row is associated.

The second table may also be described as comprising a plurality of columns, comprising a measurement data column, wherein each entry in this column is a data set datapoints field for storing individual data set datapoints associated with the set of measurement data. The second table also stores a data set ID column, wherein each entry in the column is a data set identification (ID) field which stores a data set identifier value identifying the set of measurement data to which the datapoints in the corresponding row are associated. Each data set identifier in the data set ID column of the first table may also be present in a data set ID entry in the data set ID column of the second table, thereby creating a correspondence between rows of the first table and rows of the second table. The second table may also comprise a third column, wherein each entry in the third column is a data set index field containing information regarding an ordering of the individual datapoints present in the corresponding row. At least a portion of each of the columns of the first table and the second table may be stored in a columnar format in contiguous memory.

A method for performing a query of measurement data may comprise providing a query to the data warehouse, wherein the query specifies at least one metadata characteristic. In response to the query, the program instructions may search metadata in a first table in the data warehouse. When metadata matching the query is found, the method may determine the data set ID(s) associated with this metadata. These data set ID(s) may then be provided to the user for use in a query to the second table. Alternatively, the data set ID(s) returned by the first query may be used to index into the second table to automatically find the data set datapoints associated with this data set ID. This measurement data may be provided to the user in response to the query. Due to the columnar format in which the set of measurement data is stored, the measurement data may be located and retrieved much more quickly and efficiently than prior art methods, which access raw data from a data lake.

Other aspects of the present invention will become apparent with reference to the drawings and detailed description of the drawings that follow.

BRIEF DESCRIPTION OF THE DRAWINGS

A better understanding of the present invention can be obtained when the following detailed description of the preferred embodiment is considered in conjunction with the following drawings, in which:

FIGS. 4A and 4B show a metadata table and a corresponding measurement data table according to the measurement data model described herein.

Figure 1A:
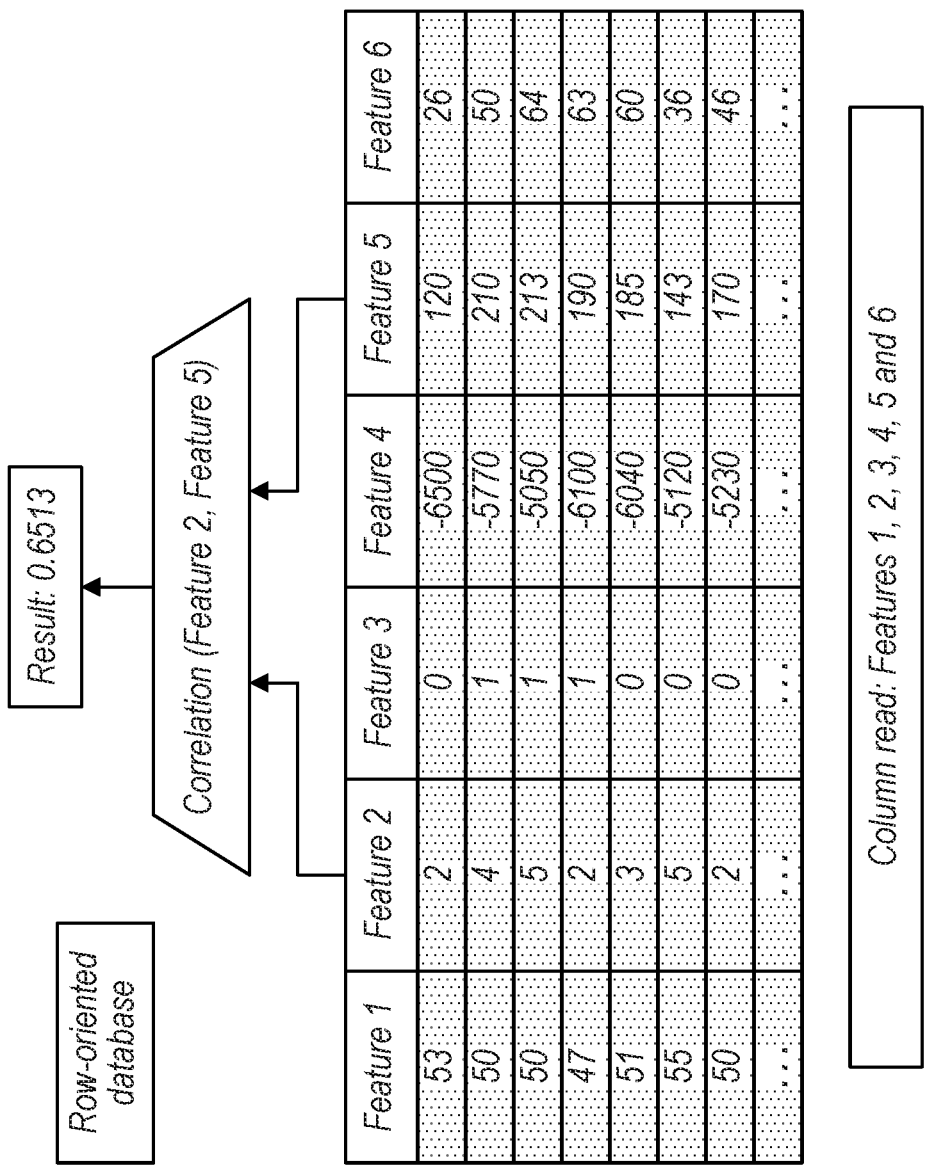
FIG. 1A shows a row-oriented database in communication with a computer.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms that may appear in the present disclosure:

Database—an organized collection of data, generally stored and accessed electronically from a computer system.

Data Warehouse—a central repository of integrated data from one or more disparate sources. A Data Warehouse may comprise one or more databases.

Data Lake—a system or repository of data wherein the data is stored in its natural or raw format, such as a file format.

Data Set—A collection of values relating to a particular subject. For example, a measurement data set may refer to a collection of data that was measured or acquired by a measurement device, such as an instrument or sensor.

Measurement Data—data that is acquired or generated in response to a measurement. Measurement data is typically generated by sensors or instruments which measure some type of real world phenomena, such as pressure, temperature, vibrations, images, video, audio, etc.

Waveform—a signal representing a data set having a periodic or quasi-periodic nature.

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Background on current Data Warehouse Implementations

Traditionally, measurement data has been stored as raw data or files on inexpensive non-volatile memory (e.g., disk) and information that enables finding these files (such as metadata) are stored in a row-oriented database structure in a searchable database. To compare this data across multiple files, multiple files in their entirety must be read from disk and loaded into computer memory and compared. This results in an inefficient use of processor and memory resources.

Embodiments described herein present a more efficient approach to data analysis on measurement data, in part through the use of column-oriented databases as a storage medium. Column-oriented databases are data warehouses designed for online analytic processing (OLAP) use. Examples of column-oriented databases include Big Query, Druid and Amazon RedShift.

A column-oriented database stores the data of a table column by column on computer memo in contrast to a row-oriented database that stores the data of a table row by row on computer memory. Embodiments are presented herein of a new measurement data model for measurement data storage which enables the data to be stored and retrieved easily in such columnar stores.

There are several advantages to using a column-oriented database rather than a row-oriented database, especially with regard to extremely large data sets. A first advantage is that far less data is required to be read in order to perform an operation on just a few data features.

FIG. 1A illustrates the result of a simple query, as follows, on a table in a row-oriented database.

SELECT correlation(feature2, feature5)
FROM records

As indicated by the highlighted entries in FIG. 1A, the traditional executor would read the entire table, including all of the field entries.

Figure 1B:
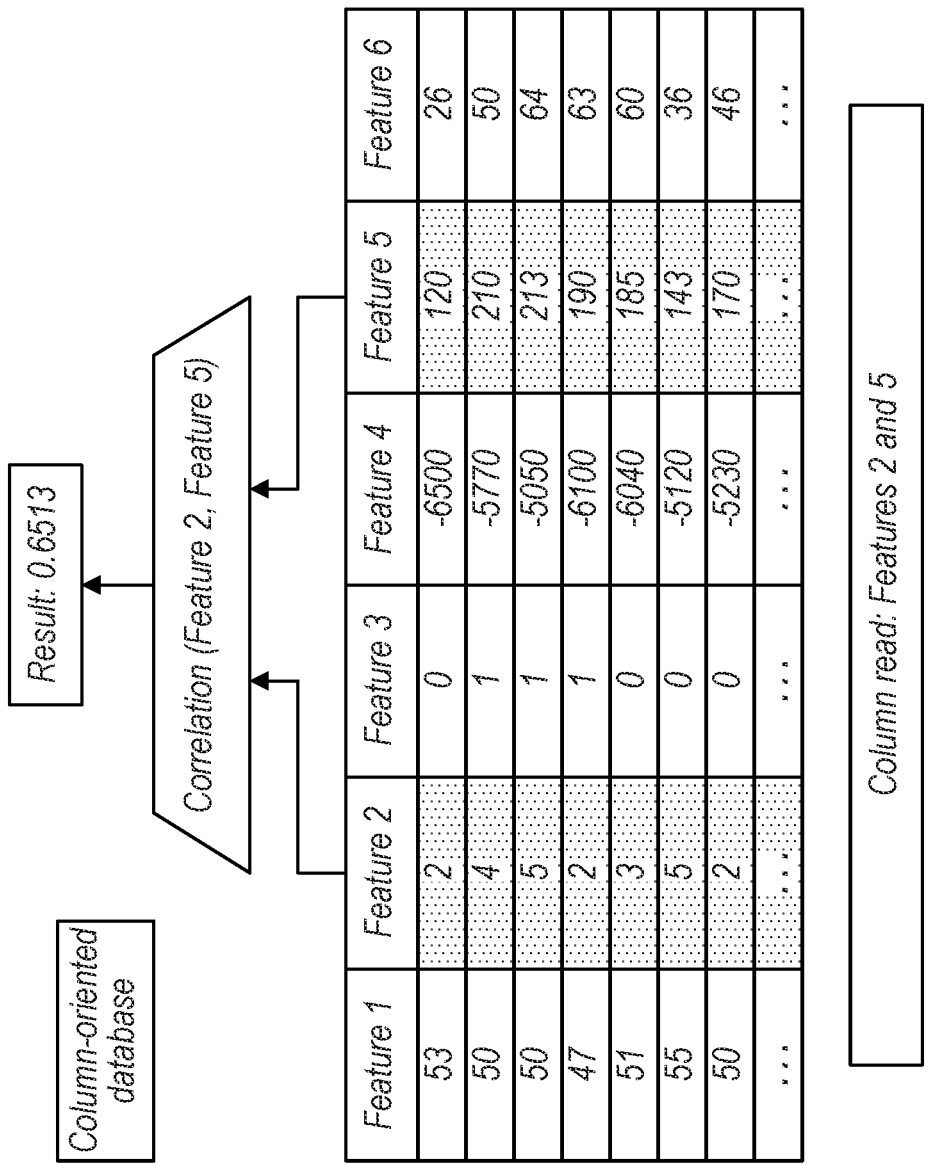
FIG. 1B shows a column-oriented database in communication with a computer.

FIG. 1B illustrates the result of the same, simple query on a similar table in a column-oriented database. As indicated by the highlighted fields, the only field entries which are read are those corresponding to the desired information.

As shown, a column-oriented database may provide analysis using far fewer processing resources than would be required by a row-oriented database.

A second advantage of the column-oriented database is that it allows for better data compression. Because values in a column are much more homogenous than values in a row, data in a column-oriented database can be better compressed than data in a row-oriented database. The columnar storage model stores each column (or sections of each column) in contiguous memory on disk. This enables fast loading into memory as well as very efficient compression. Typically, bitmap encoding such as run-length encoding and/or roaring bitmaps are used for compression. These compression techniques enable very efficient storage of large data points for both low and high cardinality data.

Figure 2:
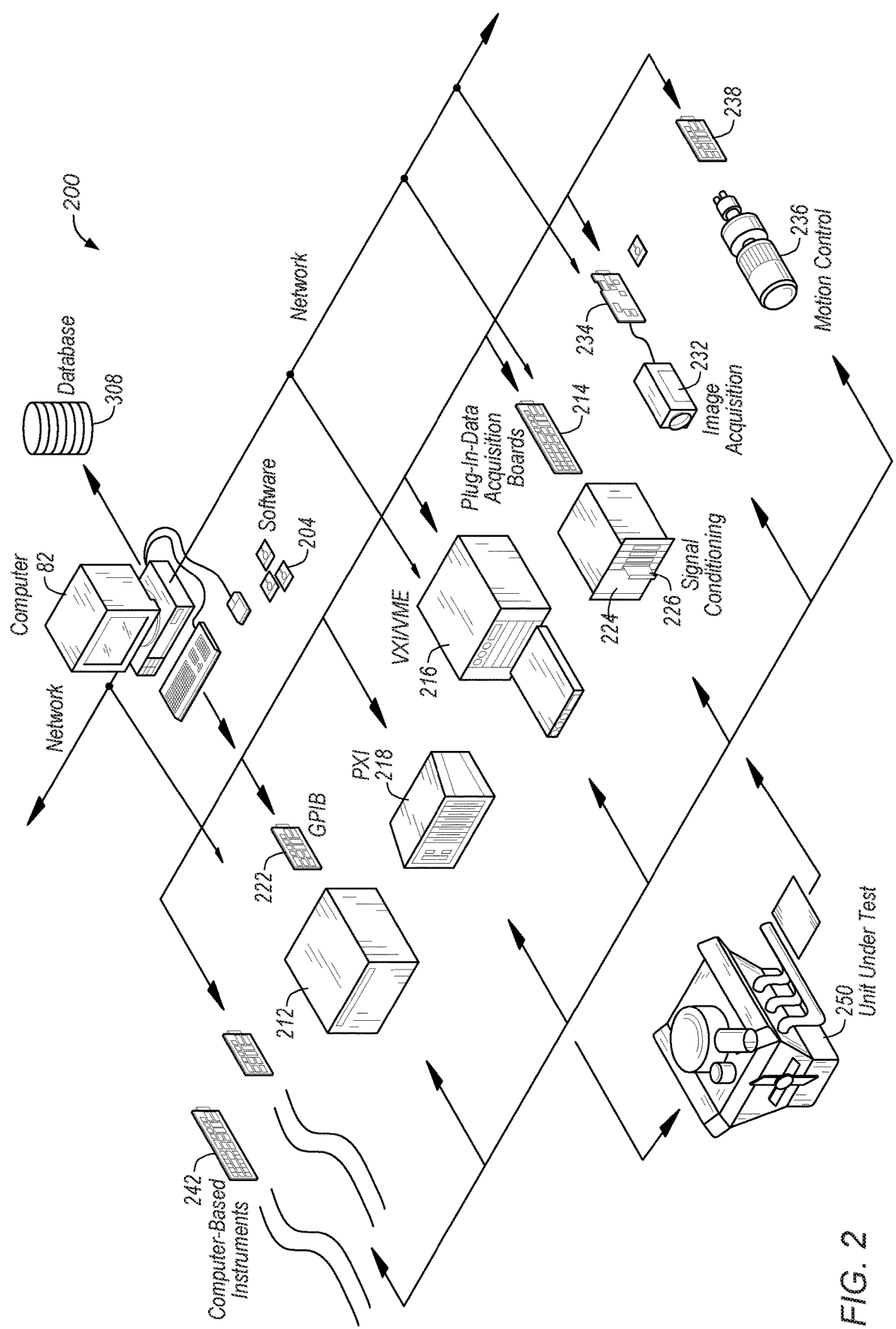
FIG. 2 shows an instrumentation measurement system for acquiring measurement data according to some embodiments.

FIG. 2—Example Measurement System

FIG. 2 illustrates an example instrumentation/measurement system 200 which may be configured to acquire measurement data and store it according to embodiments described herein. System 200 comprises a host computer 82 which may couple to one or more measurement devices (or instruments) configured to perform measurement or data acquisition of a unit under test (UUT) 250. Host computer 82 may comprise a CPU, a display screen, memory, and one or more input devices such as a mouse or keyboard as shown. Computer 82 may operate with one or more instruments to analyze, measure, or control the unit under test (UUT) or process 250. The one or more instruments may include a GPIB instrument 212 and associated GPIB interface card 222, a data acquisition board 214 inserted into or otherwise coupled with chassis 224 with associated signal conditioning circuitry 226, a VXI instrument 216, a PXI instrument 218, a video device or camera 232 and associated image acquisition (or machine vision) card 234, a motion control device 236 and associated motion control interface card 238, and/or one or more computer based instrument cards 242, among other types of devices.

The computer system 82 may couple to and operate with one or more of these instruments. In some embodiments, the computer system may be coupled to one or more of these instruments via a network connection, such as a Wireless Local Area Network (WLAN) connection or the Internet, for example, which may facilitate running a high-level synchronization protocol between the computer system and the coupled instruments. System 200 may be used in a data acquisition and control applications, in a test and measurement application, an image processing or machine vision application, a process control application, a man-machine interface application, a simulation application, or a hardware-in-the-loop validation application, among others.

Embodiments of the measurement system may operate to acquire measurement data or data of a measurement data type. The measurement system may be used in applications which involve the acquisition of measurement data having a large number of data points, e.g., the acquisition of large data sets of measurement data. Examples of such data acquisition applications include new machine learning-based test applications which process very large amounts of data to test new technologies such as Autonomous Driving (AD) and Advance Driver Assist Systems (ADAS). Thus, as one example embodiment one or more measurement devices or sensors may be configured to acquire data in an autonomous driving scenario, including data such as still images, video, vibrations, temperature, etc. and provide this for more efficient storage in a data warehouse as described herein.

The computer system 82 may be coupled to a database 308, such as a data warehouse. The computer may provide the acquired measurement data to the data warehouse 308 for storage. In some embodiments, one or both of the computer system 82 and the data warehouse 308 may store and/or execute program instructions for storing the measurement data in the data warehouse in a novel data set model format as described herein. The data warehouse 308 may be configured as a non-transitory computer-readable memory medium, or as a plurality of such memory mediums, e.g., as a cloud storage solution. For example, the data warehouse 308 may comprise a plurality of storage computer systems configured to collectively operate as storage for the data warehouse 308.

Figure 3:
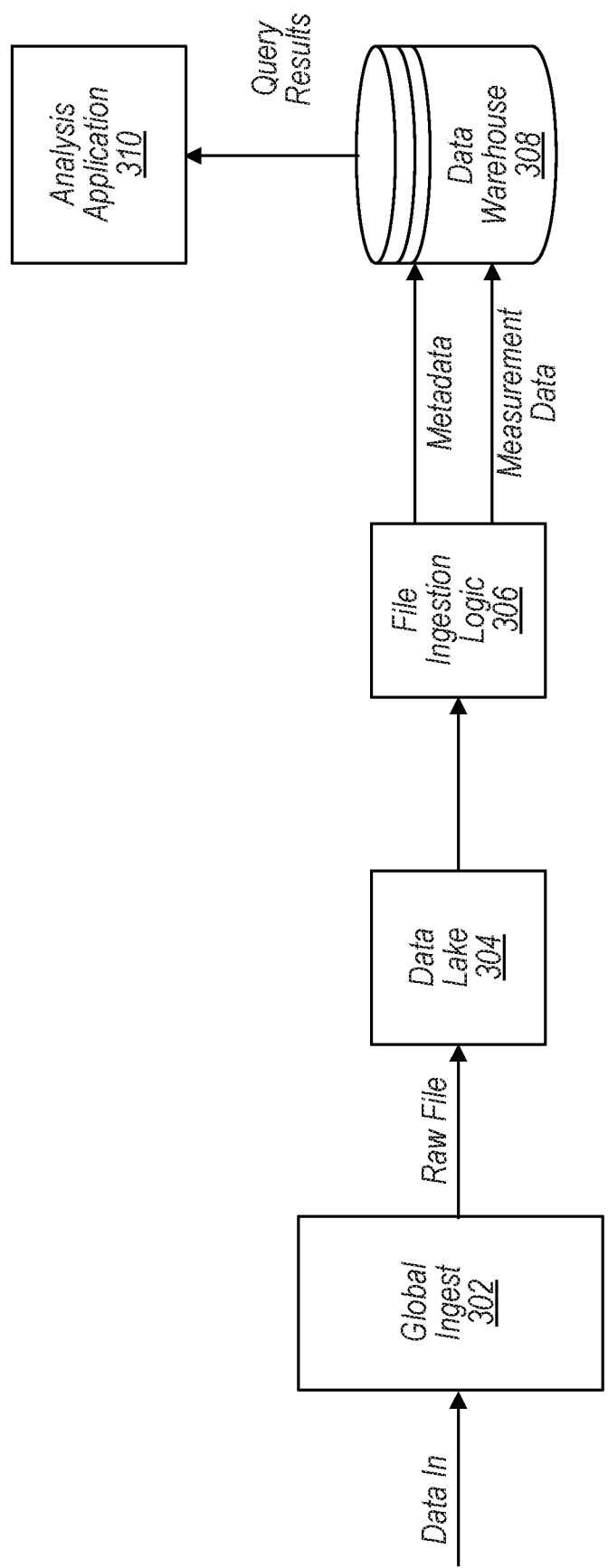
FIG. 3 shows a data management platform for processing, storing and analyzing measurement data according to the measurement data model described herein.

FIG. 3—Data Management Platform

FIG. 3 depicts a data management platform that may be used in any of various test and measurement (T&M) applications. The raw data, Data In (files containing the measurement data) may be ingested into (or received by) the data platform, through Global Ingest 302, and may be stored in a Data Lake 304. This raw data may have been acquired from a measurement system, such as that shown in FIG. 2.

The term "Data Lake" refers to a system or repository of data wherein the data is stored in its natural or raw format, such as a file format.

The File Ingestion Logic application 306 may read the raw data or files from this Data Lake 304 and extract metadata from this raw data (metadata that is stored within the raw data or files) which describe the measurement data and/or the test and measurement procedures. The metadata that is extracted from the raw data or files may comprise metadata that was known and/or created at or around the time the data was generated or acquired, such as the type of instrument used to acquire the data, the operator of the measurement system during the acquisition, the time of acquisition, etc. The File Ingestion Logic 306 may then write this metadata into at least one metadata table (the "first table") that is defined in a Data Warehouse 308 (e.g., database or data warehouse 308 of FIG. 2).

In one embodiment, the File Ingestion Logic 306 may also extract individual measurement data information from the raw data or files from the Data Lake 304. The File Ingestion Logic 306 may then write the individual measurement data information into at least one measurement data table (the "second table") that is defined in the Data Warehouse 308.

In prior art implementations, the metadata is stored in the data warehouse but the measurement data itself is maintained as raw data (files) in the data lake. As a result, prior art analysis software performs queries using the metadata in the data warehouse, and based on information gathered from the metadata, reads the raw files from the data lake into memory, consuming significant memory space and computing resources. The analysis software then filters and parses the raw files to analyze the measurement data contained therein. The filtering and parsing of the raw files by the analysis software becomes increasingly compute time intensive as the number of files in the data lake increases.

In contrast, in embodiments described herein the measurement data is stored in a new measurement data table, referred to as the Measurement Data Table (or "second table") in the Data Warehouse 308 by the File Ingestion Logic 306. In other words, instead of maintaining the measurement data as raw data in the Data Lake 304, the measurement data is stored in the Measurement Data Table in a columnar format in the Data Warehouse 308. This allows the Analysis Application 310 to avoid the necessary memory space storage and parsing and filtering time required by the process of receiving the measurement data points from the Data Lake 304. Instead, the Analysis Application 310 may read all of the measurement information directly from tables in the Data Warehouse 308, saving both memory storage and time. As noted above, the measurement data in the Measurement Data Table may be stored in a columnar format and may be compressed using any of the various techniques mentioned above.

In another embodiment, instead of intermediate storage of the data as files in the Data Lake 304, the data may be acquired from a measurement device (such as one shown in FIG. 2) and provided directly to the Data Warehouse 308 for storage in tables as described above. During the acquisition and/or transfer of the acquired measurement data from the measurement device to the Date Warehouse 308, as described above the File Ingestion Logic (or other software) may receive metadata from the measurement device as it is being acquired or measured. For example, before (or during or after) the actual measurement, the measurement device may provide metadata, such as the type of instrument used to acquire the data, the operator of the measurement system during the acquisition, the time of acquisition, etc. The File Ingestion Logic 306 may then write this metadata into at least one metadata table (the "first table") that is created in the Data Warehouse 308. Thus, here the metadata is received from the instrument or measurement device and dynamically stored in the metadata table (first table) in the Data Warehouse 308 without intermediate storage in the Data Lake 304, or possibly only a very brief temporary storage in a buffer memory, such as a buffer. Similarly, the raw measurement data from the instrument or measurement device may be dynamically written into one or more tables in the Data Warehouse 308 without intermediate storage in the Data Lake 304. For example, the File Ingestion Logic 306 may dynamically (or "on-the-fly" or in "real time") extract individual measurement data information from the raw data and may then write the individual measurement data information into at least one measurement data table (the "second table") that is defined in, or is dynamically created in, the Data Warehouse 308. This allows measurement data to be acquired from a measurement device or instrument and then dynamically (e.g., substantially immediately) stored as the first and second tables in the Data Warehouse 308, without intermediate storage as files in the Data Lake 304.

FIG. 4A illustrates a Metadata Table (first table) and FIG. 4B illustrates a corresponding Measurement Data Table (second table) in accordance with one embodiment of the present invention. As noted above, both the Metadata Table and the Measurement Data Table may be stored in the Data Warehouse.

The Metadata Table comprises columns which each store a type of metadata describing information about the sets of measurement data; for example, sampling interval, units, sensor information, time of acquisition, location of acquisition, information re above/below a threshold, etc. In FIG. 4A the metadata columns are labeled Property 1, Property 2, . . . Property n, as well as Property Time. One of the columns in this table stores an identification (ID), referred to as the Data Set ID, that serves as a unique identifier of the measurement data set the metadata describes. The inclusion of a Data Set ID in the Metadata Table is a novel aspect of the described embodiment, and operates to create a "tie" or "link" to the corresponding measurement data points stored in the new Measurement Data Table. The Metadata Table may also have other columns as well.

The Measurement Data Table (FIG. 4B) stores the actual measurement data. In this table, each point of the measurement data is distinctly identified in a Datapoints column, which allows information corresponding to each particular datapoint to be stored in the same row. Each datapoint (row) of a common set of measurement data may have the same Data Set ID.

In one embodiment, the Measurement Data Table comprises at least two columns corresponding to the Datapoints column. The first of these is the Data Set ID column. The Data Set ID column identifies the set of measurement data to which each data point belongs, and serves as a "lookup index" that connects this set of measurement data to the Data Set ID column in the Metadata Table. In other words, this Data Set ID connects or associates the measurement data to its corresponding metadata that is stored in the Metadata Table. The second of these is the Data Set Index column. The Data Set Index column describes the ordering of measurement data points in their corresponding set of measurement data. The values in the Data Set Index column enable reordering of the measurement data upon retrieval. The Measurement Data Table may also have a Property Time column as well, indicating the time the measurement data point was acquired. The Measurement Data Table may also have other columns as well.

When the Analysis Application 310 submits a query to the Data Warehouse 308, the query will typically involve a query of a specific range, type or characteristic of metadata stored in the Metadata Table. This query may be used to identify one or more rows of the Metadata Table that satisfy the query. The Data Set ID can then be obtained from these identified rows in the Metadata Table and used to access the corresponding measurement data points in the Measurement Data Table that have the same (or corresponding) Data Set ID. For example, in one embodiment one or more Data Set IDs are returned in response to the query, and these returned Data Set IDs can be used to create a second query for the associated measurement data that corresponds to these Data Set IDs. Alternatively, the identified Data Set IDs can be used by software to automatically retrieve the appropriate measurement data from the Measurement Data Table.

In this way the Data Set ID stored in the Metadata Table is used to locate or access the measurement datapoints corresponding to this identified metadata. These measurement datapoints can then be accessed or retrieved from the Data Warehouse 308. As noted above, the measurement data may be stored in a columnar format in the second table in the Data Warehouse 308. Thus, the measurement data can be accesses more efficiently, using less compute and memory resources, than prior techniques. This provides a significant improvement over prior methods where the data points are stored in a raw format in the data lake.

The following describes an example query that may be created by a user and used to acquire the Data Set ID of a set of measurement which meets certain desired characteristics.

For example, the following query

```
query = (
    "SELECT DISTINCT Data Set ID "
    " FROM " + " ""+table1+" ""
    " WHERE Property 1 <= 0 AND Property 2 > 1000"
)
``` would return:
Data Set ID=265232870606863482124890186
corresponding to the value of the Data Set ID in the first row of the Metadata Table (FIG. 4A).

The following is an example of a query that may be used to easily retrieve all of the points of a measurement data set corresponding to a particular Data Set ID, in this case, Data Set ID 265232870606863482124890186:

```
query = (
    "SELECT Data Set Datapoints "
    " FROM " + " ""+table2+" ""
    " WHERE Data Set ID = 265232870606863482124890186 "
)
```

The following is a 2-query mechanism which combines the queries above.

```
query = (
    "SELECT Data Set Datapoints, Data Set Index "
    " FROM " + " ""+table2+" ""
    " WHERE Data Set ID = 265232870606863482124890186
" OR " WHERE Data Set ID = 265232870606863482124890132 AND Data Set Datapoints > 0.034 AND Data Set Datapoints <= 0.05 "
)
```

Through this mechanism, multiple entire measurement data sets or subsets of such datasets may be retrieved. Multiple measurement data sets which need to analyzed on the basis of common characteristics may be queried in this manner, returning a subset of two measurement data sets with their corresponding index values which may then be further analyzed.

Figure 5:
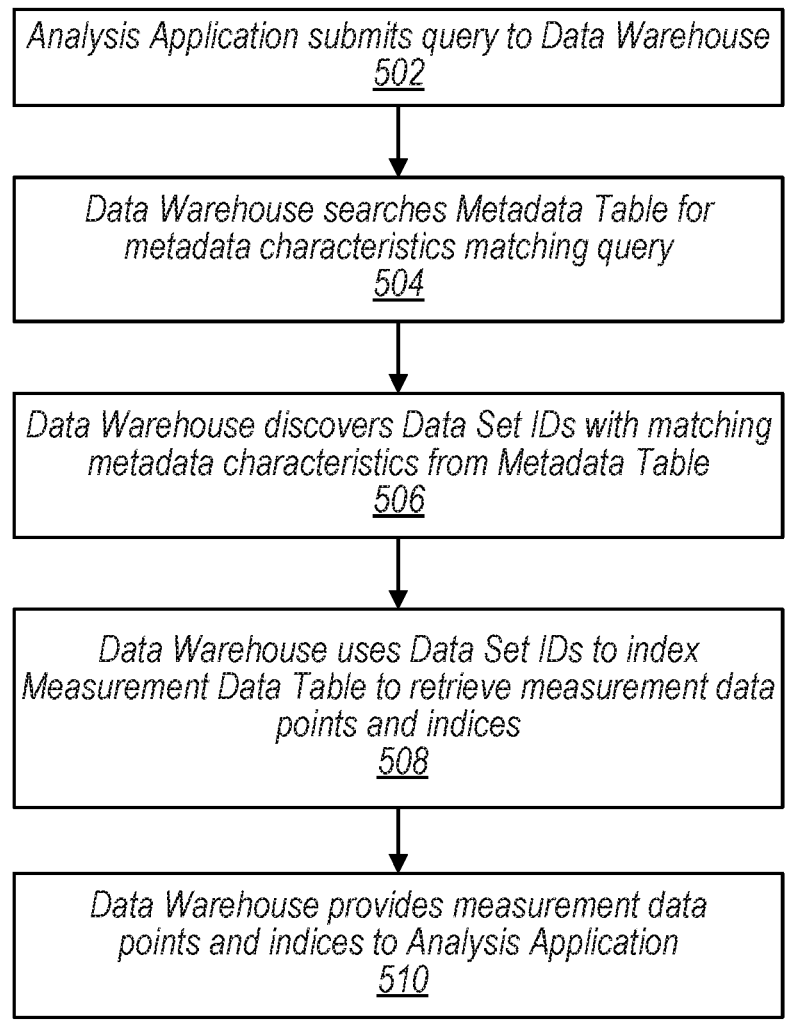
FIG. 5 is a flowchart illustrating an example of a query mechanism applied to an embodiment of the measurement data model defined herein.

FIG. 5 is a flowchart illustrating an example of a query mechanism applied to an embodiment of the data management structure defined herein.

At 502, the Analysis Application submits a query to the Data Warehouse. As previously described, the query may typically involve specific ranges, types or characteristics of metadata stored in the Metadata Table. The query may be created by a user or may be automatically generated via software.

At 504, the Data Warehouse may receive the query, search the Metadata Table, and identify one or more rows of the Metadata Table that satisfy the query. In other words, program instructions, which may reside in the Data Warehouse 308, may receive the query and perform a search of the Metadata Table to locate or identify metadata that meets the parameters of the query. These program instructions may be part of the database software that composes the Data Warehouse 308.

At 506, the Data Warehouse may then obtain one or more Data Set IDs from the identified rows in the Metadata Table. As noted above, these Data Set IDs indicate the set of measurement data to which the metadata is associated.

At 508, the Data Warehouse may use the Data Set IDs to index into the Measurement Data Table to retrieve the corresponding measurement data points and indices, enabling the proper ordering of the datapoints in the measurement data set.

At 510, the Data Warehouse may provide the datapoints and corresponding indices to the Analysis Application in response to its submitted query.

The above-described embodiments leverage the horizontally distributed compute capability offered by column-oriented databases, eliminating the constraints of a single PC trying to analyze multiple sets of measurement data by loading each one in memory. These embodiments also provide for the slicing, dicing, and drilling down of a subset of one or multiple sets of measurement data, such as waveforms.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A non-transitory computer-readable memory medium, wherein the non-transitory computer-readable memory medium stores:

a first table comprising a plurality of rows, wherein each row of the first table comprises:

a first data set identification (ID) field which stores a data set identifier value identifying a measurement data set; and one or more fields for storing measurement data metadata associated with the measurement data set identified by the data set identifier value in the first data set ID field;

a second table comprising a plurality of rows, wherein each row of the second table comprises:

a second data ID field which stores the data set identifier value present in the first data set ID field of the first table, thereby creating a correspondence between rows of the first table and rows of the second table;

a datapoints field for storing individual data set datapoints associated with the measurement data set; and a data set index field corresponding to an ordering of the individual data set datapoints;

wherein at least a portion of each of the fields of the first table are stored in a columnar format in contiguous memory; and wherein at least a portion of each of the fields of the second table are stored in a columnar format in contiguous memory, wherein the non-transitory computer-readable memory medium is configured to:

receive a query specifying at least one metadata characteristic, wherein the first table is searchable for first measurement data metadata matching the at least one metadata characteristic, and wherein the second table is searchable for first individual data set datapoints corresponding to a same data set identifier value as the first measurement data metadata; and provide the first measurement data metadata and the first individual data set datapoints.

2. The non-transitory computer-readable memory medium of claim 1, wherein all of the fields of the first table and all of the fields of the second table are stored in columnar format.

3. The non-transitory computer-readable memory medium of claim 1, wherein the memory medium stores a plurality of first tables and a plurality of second tables.

4. The non-transitory computer-readable memory medium of claim 1, wherein the memory medium comprises a plurality of memory mediums in a cloud storage configuration.

5. The non-transitory computer-readable memory medium of claim 1, wherein the measurement data set comprises a waveform acquired by a measurement device.

6. A non-transitory computer-readable memory medium, wherein the non-transitory computer-readable memory medium comprises program instructions that are executable to:

receive first measurement data comprising a plurality of measurement data sets and associated metadata;

create and store a first table comprising a plurality of rows, wherein each row of the first table comprises:

a first data set identification (ID) field which stores a data set identifier value identifying a measurement data set of the plurality of measurement data sets; and one or more fields for storing measurement data metadata associated with the measurement data set identified by the data set identifier value in the first data set ID field;

create and store a second table comprising a plurality of rows, wherein each row of the second table comprises:

a second data set ID field which stores the data set identifier value present in the first data set ID field of the first table thereby creating a correspondence between rows of the first table and rows of the second table;

a datapoints field for storing individual data set datapoints associated with the measurement data set; and a data set index field corresponding to an ordering of the individual data set datapoints;

wherein at least a portion of each of the fields of the first table are stored in a columnar format in contiguous memory; and wherein at least a portion of each of the fields of the second table are stored in a columnar format in contiguous memory, wherein the program instructions are further executable to:

receive a query specifying at least one metadata characteristic, wherein the first table is searchable for first measurement data metadata matching the at least one metadata characteristic, and wherein the second table is searchable for first individual data set datapoints corresponding to a same data set identifier value as the first measurement data metadata; and provide the first measurement data metadata and the first individual data set datapoints.

7. The non-transitory computer-readable memory medium of claim 6, wherein the first measurement data are received as files from a data lake.

8. The non-transitory computer-readable memory medium of claim 6, wherein the first measurement data are received from a measurement device and dynamically transferred to and stored in the first and second tables without intermediate storage in a data lake.

9. The non-transitory computer-readable memory medium of claim 6, wherein all of the fields of the first table and all of the fields of the second table are stored in a data warehouse arranged in a columnar format for online analytical processing (OLAP).

10. The non-transitory computer-readable memory medium of claim 6, wherein the first table and the second table are stored in a data warehouse.

11. A non-transitory computer-readable memory medium, wherein the non-transitory computer-readable memory medium stores:

a first table comprising a plurality of columns, comprising:

a first column, wherein each entry in the first column is a data set identification (ID) field which stores a data set identifier value identifying a measurement data set; and a plurality of metadata columns, wherein each metadata column has entries storing measurement data metadata, wherein each entry of measurement data metadata is associated with a respective measurement data set identified by a respective data set identifier value in the first column;

a second table comprising a plurality of columns, comprising:

a first column, wherein each entry in the column is a data set ID field which stores the data set identifier value identifying the measurement data set, wherein each data set identifier value in the data set ID field of the first column of the second table is also present in the data set ID entry in the first column of the first table, thereby creating a correspondence between rows of the first table and rows of the second table;

a second column, wherein each entry in the second column is a datapoints field for storing individual data set datapoints associated with the measurement data set; and a third column, wherein each entry in the third column is a data set index field containing information regarding an ordering of the individual data set datapoints;

wherein at least a portion of each of the columns of the first table are stored in a columnar format in contiguous memory; and wherein at least a portion of each of the columns of the second table are stored in a columnar format in contiguous memory, wherein the non-transitory computer-readable memory medium is configured to:

receive a query specifying at least one metadata characteristic, wherein the first table is searchable for first measurement data metadata matching the at least one metadata characteristic, and wherein the second table is searchable for first individual data set datapoints corresponding to a same data set identifier value as the first measurement data metadata; and provide the first measurement data metadata and the first individual data set datapoints.

12. The non-transitory computer-readable memory medium of claim 11, wherein all of the fields of the first table are stored in columnar format.

13. The non-transitory computer-readable memory medium of claim 11, wherein all of the fields of the second table are stored in columnar format.

14. The non-transitory computer-readable memory medium of claim 11, wherein all of the fields of the first table and all of the fields of the second table are stored in a data warehouse arranged in a columnar format for online analytical processing (OLAP).

15. A method for storing measurement data in a data warehouse, the method comprising:

receiving first measurement data comprising a plurality of measurement data sets and associated metadata;

creating and storing a first table comprising a plurality of rows in a data warehouse, wherein each row of the first table comprises:

a first data set identification (ID) field which stores a data set identifier value identifying a measurement data set; and one or more fields for storing measurement data metadata associated with the data set identified by the data set identifier value in the first data set ID field;

creating and storing a second table comprising a plurality of rows in the data warehouse, wherein each row of the second table comprises:

a second data set ID field which stores the data set identifier value present in the first data set ID field of the first table thereby creating a correspondence between rows of the first table and rows of the second table;

a datapoints field for storing individual data set datapoints associated with the measurement data set; and a data set index field corresponding to an ordering of the individual data set datapoints;

wherein at least a portion of each of the fields of the first table are stored in a columnar format in contiguous memory; and wherein at least a portion of each of the fields of the second table are stored in a columnar format in contiguous memory;

receiving a query specifying at least one metadata characteristic, wherein the first table is searchable for first measurement data metadata matching the at least one metadata characteristic, and wherein the second table is searchable for first individual data set datapoints corresponding to a same data set identifier value as the first measurement data metadata; and providing the first measurement data metadata and the first individual data set datapoints.

16. A method for performing a query of measurement data, the method comprising:

providing a query to a data warehouse, wherein the query specifies at least one metadata characteristic;

searching a first table in the data warehouse based on the query, wherein the first table comprises a plurality of rows, wherein each row of the first table comprises:

a first data set identification (ID) field which stores a data set identifier value identifying a measurement data set; and one or more fields for storing measurement data metadata associated with the data set identified by the data set identifier value in the first data set ID field;

wherein at least a portion of each of the fields of the first table are stored in a columnar format in contiguous memory;

receiving a result based on the provided query, wherein the result specifies one or more data set ID values from the first table;

retrieving one or more individual data set datapoints from a second table in the data warehouse, wherein the second table comprises a plurality of rows, wherein each row of the second table comprises:

a second data ID field which stores the data set identifier value present in the first data set ID field of the first table, thereby creating a correspondence between rows of the first table and rows of the second table;

a datapoints field for storing individual data set datapoints associated with the measurement data set; and a data set index field corresponding to an ordering of the individual data set datapoints;

wherein the one or more individual data set datapoints are is retrieved from the second table based on the one or more data set ID values provided as the result from the first table.

17. The method of claim 16, wherein at least a portion of each of the fields of the second table are stored in a columnar format in contiguous memory.

18. A non-transitory computer-readable memory medium, wherein the non-transitory computer-readable memory medium comprises program instructions that are executable to:

receive a query to a data warehouse, wherein the query specifies at least one metadata characteristic;

search a first table in the data warehouse based on the query, wherein the first table comprises a plurality of rows, wherein each row of the first table comprises:

a first data set identification (ID) field which stores a data set identifier value identifying a measurement data set; and one or more fields for storing measurement data metadata associated with the data set identified by the data set identifier value in the first data set ID field;

wherein at least a portion of each of the fields of the first table are stored in a columnar format in contiguous memory;

provide a result based on the provided query, wherein the result specifies one or more data set ID values from the first table;

retrieve one or more individual data set datapoints from a second table in the data warehouse, wherein the second table comprises a plurality of rows, wherein each row of the second table comprises:

a second data set ID field which stores a data set identifier value present in the first data set ID field of the first table, thereby creating a correspondence between rows of the first table and rows of the second table;

a datapoints field for storing individual data set datapoints associated with the measurement data set; and a data set index field corresponding to an ordering of the individual data set datapoints;

wherein the one or more individual data set datapoints are is retrieved from the second table based on the one or more data set ID values provided as the result from the first table.

19. The non-transitory computer-readable memory medium of claim 18, wherein at least a portion of each of the fields of the second table are stored in a columnar format in contiguous memory.

20. The non-transitory computer-readable memory medium of claim 18, wherein the memory medium comprises a plurality of memory mediums in a cloud storage configuration.

* * * * *

UNITED STATES PATENT AND TRADEMARK OFFICE
CERTIFICATE OF CORRECTION

PATENT NO. : 11,288,281 B2
APPLICATION NO. : 16/875566
DATED : March 29, 2022
INVENTOR(S) : Chandhoke It is certified that error appears in the above-identified patent and that said Letters Patent is hereby corrected as shown below:

In the Claims

Claim 16, Column 14, Line 43, please delete "is" before "retrieved".

Claim 18, Column 15, Line 18, please delete "is" before "retrieved".

Signed and Sealed this
Twenty-fourth Day of May, 2022

Katherine Kelly Vidal
*Director of the United States Patent and Trademark Office*